(12) United States Patent
Melberg et al.

(10) Patent No.: US 7,309,045 B2
(45) Date of Patent: Dec. 18, 2007

(54) MODULAR VEHICLE UNITS, INCLUDING AIRCRAFT INTERIOR STORAGE UNITS, AND ASSOCIATED METHODS

(75) Inventors: David S. Melberg, Seattle, WA (US); Jonathan T. Barrows, Seattle, WA (US)

(73) Assignee: The Boeing Company, Chicago, IL (US)

( * ) Notice: Subject to any disclaimer, the term of this patent is extended or adjusted under 35 U.S.C. 154(b) by 297 days.

(21) Appl. No.: 10/978,890

(22) Filed: Nov. 1, 2004

(65) Prior Publication Data

US 2006/0091257 A1 May 4, 2006

(51) Int. Cl.
*B64D 11/00* (2006.01)
(52) U.S. Cl. .................. 244/118.5; 244/118.1
(58) Field of Classification Search ........... 244/118.1, 244/118.2, 118.5, 118.6; 248/225.21, 221.11, 248/222.11, 222.13; 292/95, 101
See application file for complete search history.

(56) References Cited

U.S. PATENT DOCUMENTS

| | | | | |
|---|---|---|---|---|
| 3,379,195 | A * | 4/1968 | Bleach | 128/205.25 |
| 5,145,128 | A * | 9/1992 | Umeda | 244/118.5 |
| 5,383,628 | A | 1/1995 | Harriehausen | |
| 5,549,258 | A | 8/1996 | Hart | |
| 5,687,929 | A | 11/1997 | Hart | |
| 5,716,027 | A | 2/1998 | Hart | |
| 5,842,668 | A * | 12/1998 | Spencer | 244/118.1 |
| 5,938,149 | A | 8/1999 | Terwesten | |
| 5,985,362 | A * | 11/1999 | Specht et al. | 427/236 |
| 6,007,024 | A * | 12/1999 | Stephan | 244/118.1 |
| 6,318,671 | B1 | 11/2001 | Schumacher | |
| 6,484,969 | B2 | 11/2002 | Sprenger | |
| 2006/0049310 | A1* | 3/2006 | Park et al. | 244/118.5 |

FOREIGN PATENT DOCUMENTS

EP 0 722 404 7/1996

OTHER PUBLICATIONS

"Upper Deck Sidewal Stowage Boxes," 747-400 Maintenance Manual, 3 pgs.
"Lightweight Seats Project," Sep. 20, 1995, 5 pgs, Johnson Space Center, Houston, Texas.
"050-0100 Two-Rotor Latch," Dec. 1999, 3 pgs, TriMark, New Hampton, Iowa.
Chrysler Town & Country 2002 Owner's Manual, p. 133-135, 2001, DaimlerChrysler Corporation.
"Passenger Seat Installation," Aircraft Maintenance Manual, 7 pgs.

* cited by examiner

*Primary Examiner*—Timothy D. Collins
(74) *Attorney, Agent, or Firm*—Perkins Coie LLP (57) ABSTRACT

Modular vehicle units, including aircraft interior storage units, and associated methods are disclosed herein. One embodiment is directed toward an aircraft system that includes a modular unit and at least one latch or releasable coupler to couple the modular unit to at least one surface of an aircraft. Another embodiment is directed toward a vehicle system that includes a vehicle having a first surface and a second surface. A modular unit can be positioned generally against the first and second surfaces. The system can further include at least one latch or releasable coupler to couple the modular unit to at least one of the first and second surfaces. In further embodiments, the system can include at least one locating device for positioning the modular unit.

35 Claims, 4 Drawing Sheets

MODULAR VEHICLE UNITS, INCLUDING AIRCRAFT INTERIOR STORAGE UNITS, AND ASSOCIATED METHODS

TECHNICAL FIELD

Embodiments of the present invention relate to modular vehicle units and associated methods, for example, modular aircraft units that are installed in an aircraft to provide storage and/or house various components.

BACKGROUND

Vehicles often include cabinets that serve as storage space and/or house electrical components. For example, some mini-vans have free-standing cabinets that are movable among multiple fixed locations between laterally disposed seats. These free-standing cabinets connect to the floor of the vehicle with a hook mechanism and include electrical connections for plugging in accessories (e.g., a cellular phone recharging device).

Aircraft, which are often subject to more severe operating environments and more stringent/rigorous safety regulations than automobiles, also use cabinets to provide storage space and/or to house electrical components. For example, an aircraft cockpit often includes several storage bins, instrument panels, and other electrical devices housed in cabinets throughout the cockpit. These cabinets or bins are generally built into the cockpit and/or attached to the cockpit via various fasteners (e.g., screws and/or nuts or bolts) to withstand predetermined levels of acceleration in various directions.

Accordingly, special brackets and/or subframes are often required to install these cabinets in the cockpit resulting in a large number of parts being required and a substantial amount of weight being dedicated to installing and supporting the cabinets. Additionally, installing the cabinets with fasteners can take a significant amount of time. The high part count and significant amount of installation time associated with these cabinets can increase manufacturing time and expense. Additionally, maintaining, repairing, and/or replacing these cabinets can be difficult and time-intensive.

SUMMARY

The present invention is directed generally toward modular vehicle units and associated methods. One aspect of the invention is directed toward an aircraft system that includes a modular unit and at least one latch or releasable coupler to couple the modular unit to at least one surface of an aircraft. The latch can be movable between an engaged position and a released position. The latch can have a first portion coupled to the modular unit and a second portion couplable to the at least one surface. When the second portion of the latch is coupled to the at least one surface, the modular unit can be (a) couplable to the at least one surface when the latch is in the engaged position and (b) structurally removable from the at least one surface when the latch is in the released position. In a further aspect of the invention, the system can include at least one locating device for positioning the modular unit relative to the at least one surface. In a still further aspect of the invention, the modular unit can include at least one of a console, a storage area, and a computing device.

Another aspect of the invention is directed toward a vehicle system that includes a vehicle having a first surface and a second surface. The first surface can extend generally along a first plane and the second surface can extend generally along a second plane different than the first plane. A modular unit can be positioned generally against the first and second surfaces. The system can further include at least one latch or releasable coupler to couple the modular unit to at least one of the first and second surfaces. The latch can be movable between an engaged position and a released position. The latch can have a first portion coupled to the modular unit and a second portion coupled to at least one of the first and second surfaces. The modular unit can be coupled to at least one of the first and second surfaces when the latch is in the engaged position and structurally removable from the first and second surfaces when the latch is in the released position.

Still another aspect of the invention is directed toward a method for making an aircraft system that includes configuring a modular unit to be couplable to at least one surface of an aircraft and arranging at least one latch to couple the modular unit to the at least one surface. The latch can be movable between an engaged position and a released position. When the latch is in the engaged position, the modular unit can be couplable to the at least one surface and when the latch is in the released position, the modular unit can be structurally removable from the at least one surface.

Yet another aspect of the invention is directed toward a method for making a vehicle system that includes positioning a modular unit generally against a first surface of a vehicle and a second surface of the vehicle. The first surface can extend generally along a first plane and the second surface can extend generally along a second plane different than the first plane. The method can further include coupling the modular unit to at least one of the first and second surfaces with at least one latch. When the latch is in the engaged position, the modular unit can be coupled to at least one of the first and second surfaces and when the latch is in the released position, the modular unit can be structurally removable from the first and second surfaces.

Still another aspect of the invention is directed toward a method for making an aircraft system that includes coupling a modular unit to at least one surface of an aircraft with at least one latch. The latch can be movable between an engaged position and a released position. When the latch is in the engaged position, the modular unit can be couplable to the at least one surface and when the latch is in the released position, the modular unit can be structurally removable from the at least one surface.

DETAILED DESCRIPTION

The present disclosure describes modular vehicle units and associated methods. Several specific details of the invention are set forth in the following description and in FIGS. 1-9 to provide a thorough understanding of certain embodiments of the invention. One skilled in the art, however, will understand that the present invention may have additional embodiments, and that other embodiments of the invention may be practiced without several of the specific features described below. For example, although many embodiments are discussed with reference to modular units installed in the interior of a vehicle, it will be understood that modular units can also be installed on the exterior of a vehicle using similar techniques.

Figure 1:
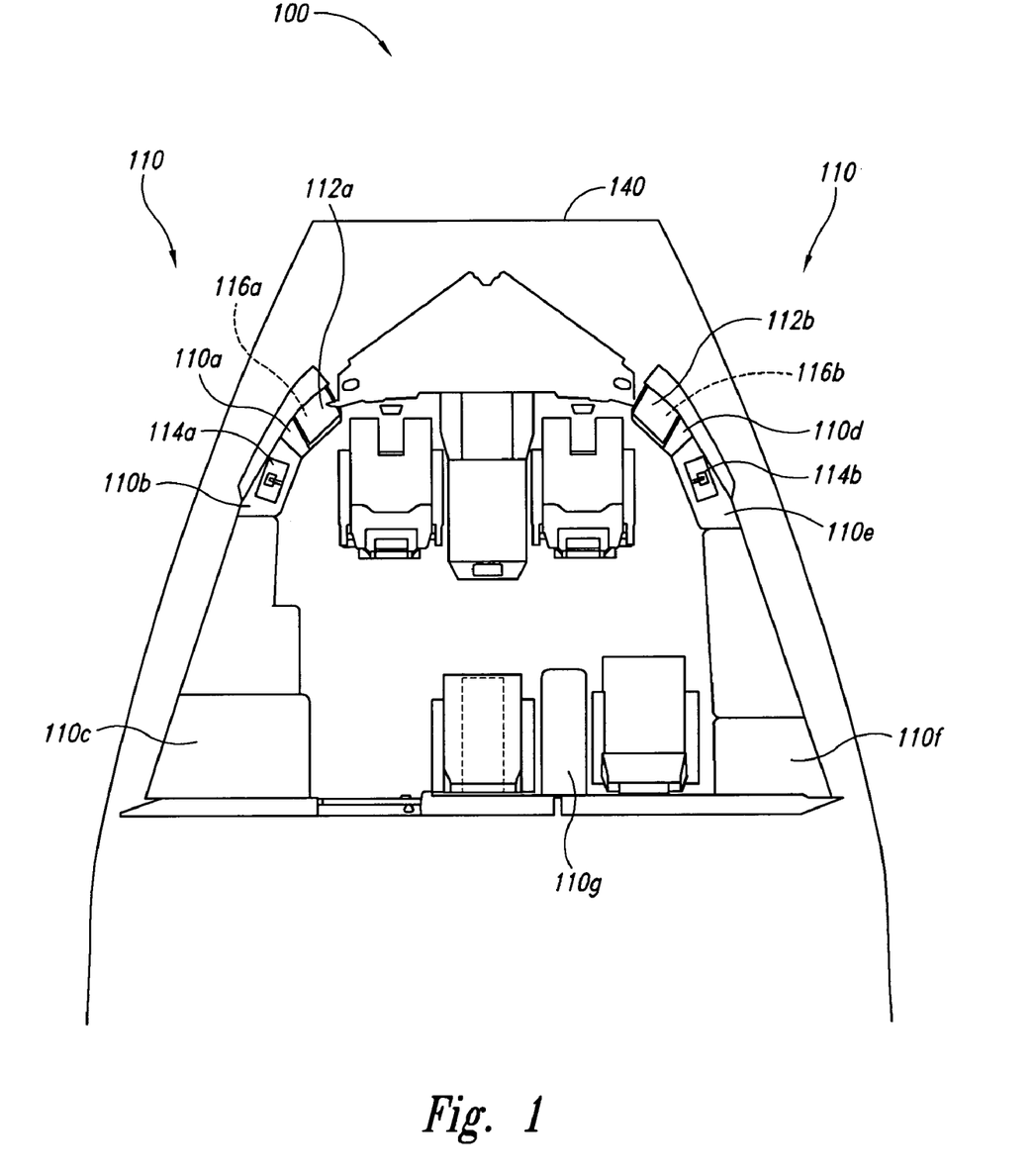
FIG. 1 is a partially schematic illustration of a vehicle system that includes an aircraft with a cockpit having modular units in accordance with embodiments of the invention.

FIG. 1 is a partially schematic illustration of a vehicle system 100 that includes a vehicle 140 (e.g., an aircraft) with modular units 110 configured in accordance with an embodiment of the invention. In FIG. 1, seven modular units 110 are shown as a first modular unit 110a, a second modular unit 110b, a third modular unit 110c, a fourth modular unit 110d, a fifth modular unit 110e, a sixth modular unit 110f, and a seventh modular unit 110g. Other embodiments can have more or fewer modular units 110. In the illustrated embodiment, each of the modular units 110 is coupled to one or more surfaces of the vehicle 140 by at least one latch (not visible in FIG. 1) so that the modular units can be easily and quickly installed, removed, and/or replaced.

The modular units 110 can include one or more storage spaces and/or consoles. For example, a portion of the first modular unit 110a is operatively coupled to an electromagnetic source (e.g., a power supply) and the first modular unit 110a includes a first computing device 116a in a first console 112a housing a first display. In a particular embodiment, the first computing device 116a and first display can be portions of an electronic flight bag system. A portion of the fourth modular unit 110d is operatively coupled to the same or a different electromagnetic source and the fourth modular unit 110d includes a second computing device 116b and a second console 112b housing a second display (e.g., a weather radar display). The second modular unit 110b includes a first storage space 114a coupled to an oxygen supply and the fifth modular unit 110e includes a second storage space 114b coupled to the same or a different oxygen supply. The first and second storage units 114a, 114b can carry oxygen masks for dispensing oxygen. Because the modular units 110 are coupled to the vehicle by latches, they can have low part counts, and can be easily and quickly installed and/or removed.

Figure 2:
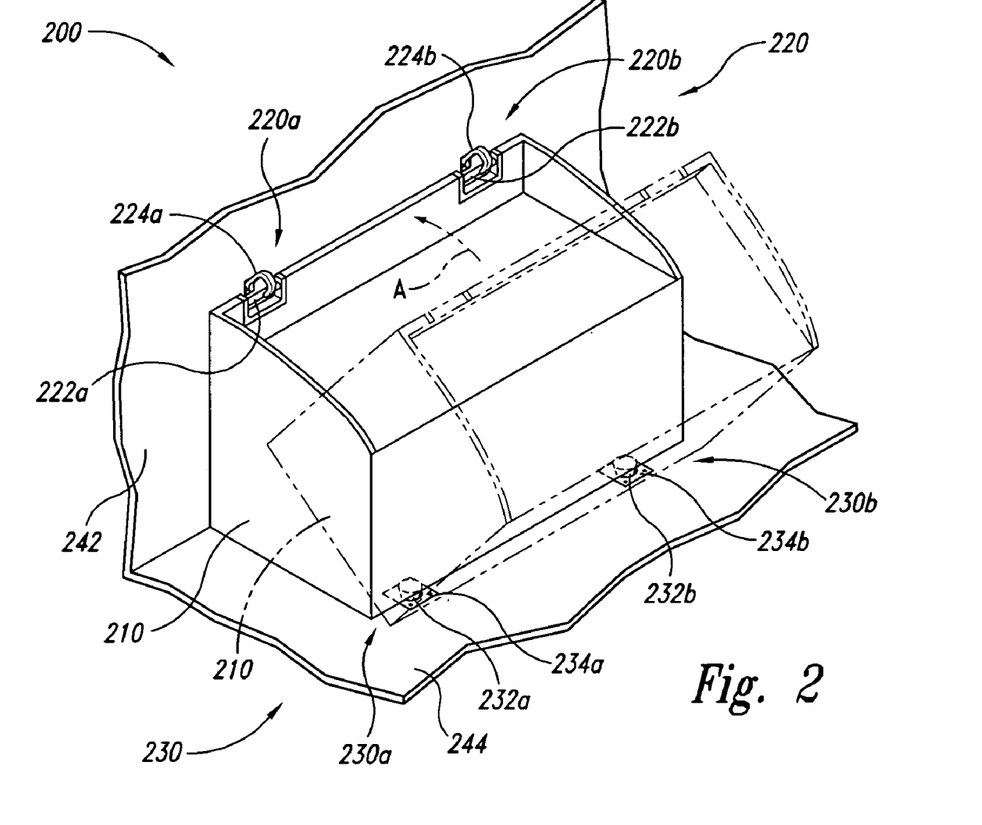
FIG. 2 is a partially schematic illustration of a vehicle system that includes a modular unit, latches, and locating devices in accordance with embodiments of the invention.

FIG. 2 is a partially schematic illustration of a vehicle system 200 having a modular unit 210 and at least one latch or releasable coupler 220 for coupling the modular unit 210 to a vehicle. In the illustrated embodiment, the modular unit 210 is shown positioned generally against a first surface 242 of the vehicle and a second surface 244 of the vehicle. The first surface 242 can extend generally along a first plane and the second surface 244 can extend generally along a second plane, different than the first. In FIG. 2, two latches 220 are shown as a first latch 220a and a second latch 220b. The first latch 220a includes a first portion 222a coupled (e.g., fixedly coupled) to the modular unit 210 and a second portion 224a that is coupled (e.g., fixedly coupled) to the first surface 242. Similarly, the second latch 220b includes a first portion 222b coupled to the modular unit 210 and a second portion 224b coupled to the first surface 242. In other embodiments, the vehicle system 200 can have more or fewer latches 220. In still other embodiments, the modular unit 210 can be positioned generally against only the first surface 242 of the vehicle.

At least one locating device 230 can be used to position the modular unit 210 relative to at least one of the first surface 242 and the second surface 244. In the illustrated embodiment, two locating devices 230 are shown as a first locating device 230a and a second locating device 230b. The first locating device 230a can include a male portion 232a coupled to the modular unit 210 (e.g., the male portion 232a can be connected to the modular unit 210 or it can be an integral part of the modular unit 210). The first locating device 230a can also include a female portion 234a coupled to the second surface 244 (e.g., the female portion 234a can be connected to the second surface 244 or be an integral part of the second surface 244). The female portion 234a can be configured to receive the male portion 232a.

Similarly, the second locating device 230b can include a male portion 232b coupled to the modular unit 210 and a female portion 234b coupled to the second surface 244. The female portion 234b of the second locating device 230b can be configured to receive the male portion 232b. Other embodiments can have more or fewer locating devices 230, including no locating devices 230. In certain embodiments, the locating devices 230 can be configured to prevent the modular unit 210 from moving in at least one direction relative the first surface 242 and/or the second surface 244 (e.g., to prevent the modular unit 210 from sliding laterally across the second surface 244).

To install or couple the modular unit 210 to the vehicle, the modular unit 210 can be positioned and/or tilted relative to the first surface 242 as shown in ghosted lines in FIG. 2 to engage the first and second locating devices 230a, 230b. The modular unit 210 can then be rotated toward the first surface 242 (as indicated by arrow A). In the illustrated embodiment, once rotated into place, the modular unit 210 is generally positioned against the first and second surfaces 242, 244 (e.g., touching a portion of each surface and/or proximate to each surface with no more than a small gap). The first and second latches 220a, 220b can then be moved from a released position to an engaged position coupling the modular unit 220 to the first surface 242. Once the modular unit 210 is coupled to the first surface 242 by the latches 220, the modular unit can be held in place relative to the first and second surfaces 242, 244 by a combination of the latches 220, the first and second surfaces 242, 244, and/or the locating devices 230. The process can be reversed to structurally remove the modular unit 210 from the first and second surfaces 242, 244.

Figure 3A:
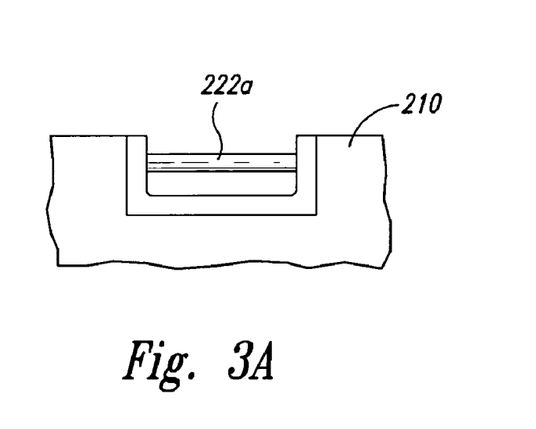
FIG. 3A is a partially schematic illustration of a portion of one of the latches shown in FIG. 2.
Figure 3B:
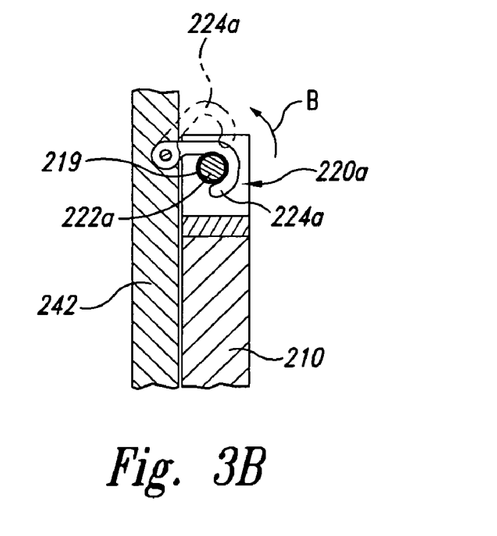
FIG. 3B is a partially schematic cross-sectional elevation view of a portion of the modular unit and one of the latches shown in FIG. 2.

The latches 220 of the vehicle system 200 can include various arrangements. For example, FIG. 3A is a partially schematic enlarged illustration of the first portion 222a of the first latch 220a shown in FIG. 2. FIG. 3B is a partially schematic cross-sectional elevation view of the first latch 220a (shown in FIG. 2) in the engaged position. In the illustrated embodiment, the first portion 220a includes an engagement member (e.g., a bar) coupled to the modular unit 210. The second portion 224a of the first latch 220a can be coupled to the first surface 242 of the vehicle and include a catch member (e.g., a movable hook) for receiving or engaging the engagement member. In the engaged position, the engagement member has been received and/or engaged by the catch member and the modular unit 210 is coupled to the first surface 242. In the illustrated embodiments, the catch member can be rotated in the direction of arrow B to a released position (shown in ghosted lines). In the released position, the engagement member is no longer received and/or engaged by the catch member and the first latch 220a no longer couples the modular unit 210 to the first surface 242 of the vehicle. In certain embodiments, the first latch 220a can include a locking mechanism for locking the first latch 220a in the released and/or engaged position. In other embodiments, the first latch 220a can include one or more detents to resist movement of the first latch 220a out of the released and/or engaged position.

In certain embodiments, insulation can be placed on the first portion 222a of the first latch 220a and/or the second portion 224a of the first latch 220a to provide shock absorption and/or to reduce vibration. In other embodiments, the insulation 219 can be omitted and/or additional insulation 219 can be used (e.g., insulation can be positioned between the first surface 242, the second surface (not shown in FIG. 3A or 3B), and the modular unit 210). The insulation 219 can be made of various materials, including rubber, plastic, and/or a composite material.

Figure 4:
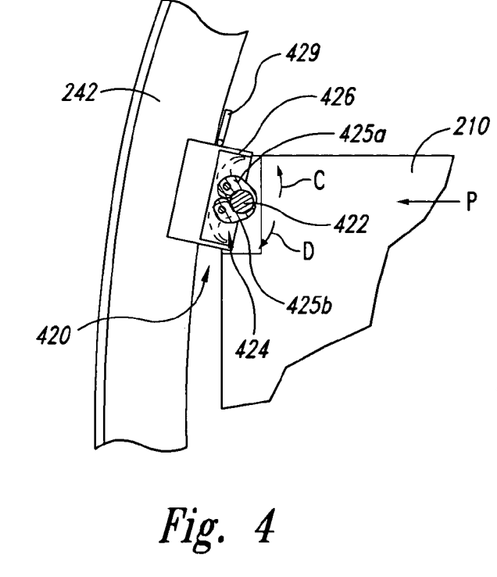
FIG. 4 is a partially schematic cross-sectional elevation view of a latch that can be used in a vehicle system in accordance with another embodiment of the invention.

FIG. 4 illustrates a latch arrangement in accordance with another embodiment of the invention. In FIG. 4, the latch 420 includes a first portion 422 that is coupled to the modular unit 210 and a second portion 424 that is coupled to the first surface 242. The first portion 422 includes an engagement member (e.g., a bar or knob) and the second portion 424 includes a catch member for receiving or engaging the engagement member. In the illustrated embodiment, the catch member includes two hooked-shaped parts or hooks shown as a first part 425a and a second part 425b. In other embodiments, the latch 420 can have more or fewer parts, more or fewer engagement members, and/or more or fewer catch numbers. When the latch 420 is in the engaged position, the engagement member is received and/or engaged by the catch member (e.g., the first and second parts 425a, 425b) and the latch 420 couples the modular unit 210 to the first surface 242. When the latch 420 is in the released position, the engagement member can be separated from the catch member.

In the illustrated embodiment, the catch member 424 is coupled to the first surface 242 via a housing 426. In other embodiments, the catch member can be coupled to the first surface without a housing (e.g., the catch member can be pivotally connected to the first surface 242). A release 429 (e.g., a lever operated release) is operatively coupled to the catch member of the latch 420 via the housing 426. In the illustrated embodiment, when the release is operated, the first and second parts 425a, 425b of the catch member move away from one another as indicated by arrows C and D to the released position (shown in ghosted lines). When the engagement member is positioned between and pressed toward the first and second parts 425a, 425b in the direction of arrow P, the first and second parts 425a, 425b move toward one another (opposite arrows C and D) to the engaged position. In other embodiments, the release 429 can also be used to move the latch 420 from the released position to the engaged position.

Figure 5:
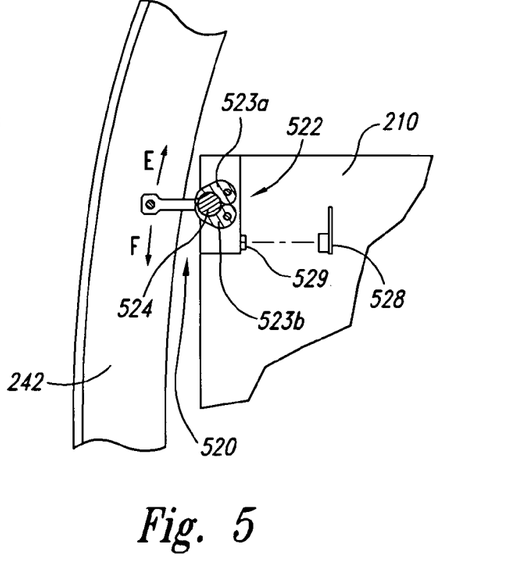
FIG. 5 is a partially schematic cross-sectional elevation view of another latch that can be used with a vehicle system in accordance with still another embodiment of the invention.

FIG. 5 illustrates a latch arrangement in accordance with yet another embodiment of the invention. In FIG. 5, the latch 520 includes a first portion 522 coupled to the modular unit 210 and a second portion 524 coupled to the first surface 242. The second portion 524 includes an engagement member (e.g., a knob or bar similar to the engagement member of the first portion 422 of the latch 420 in FIG. 4). In the illustrated embodiment, the engagement member is coupled to the first surface 242. In other embodiments, the engagement member can be an integral portion of the first surface 242.

The first portion 522 of the latch 520 includes a catch member with two movable hook-shaped parts or hooks, shown as a first part 523a and a second part 523b (similar to the first and second parts 425a, 425b shown in FIG. 4). The first and second parts 523a, 523b are configured to receive and/or engage the engagement member when the latch is in the engaged position (as shown in FIG. 5), coupling the modular unit 210 to the first surface 242. A release 529 (e.g., a rotatable knob) is operatively coupled to the latch 520 and configured to move the latch between the engaged position and a released position. To move from the engaged position (shown in FIG. 5) to the released position, the first and second parts 523a, 523b are moved away from each other (as indicated by arrows E and F). In the released position, the engagement member is released (e.g., removable) from the catch member. The motion of the first and second parts 523a, 523b is reversed to move the latch back to the engaged position. In certain embodiments, the release 529 can be configured to be operated by a tool 528 (e.g., an attachable handle).

Figure 6:
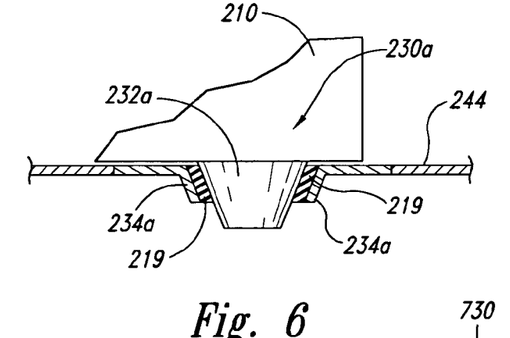
FIG. 6 is a partially schematic cross-sectional illustration of one of the locating devices shown in FIG. 2.

The locating device(s) discussed above with reference to FIG. 2 can also include various arrangements. For example, FIG. 6 is a partially schematic expanded view of the first locating device 230a shown in FIG. 2. As discussed above, the male portion 232a of the first locating device 230a can be coupled to the modular unit 210 (e.g., integral with the modular unit and/or attached to the modular unit 210). The female portion 234a of the first locating device 230a can be coupled to the second surface 244 (e.g., integral with and/or attached to the second surface 244). The female portion 234a of the first locating device 230a can receive the male portion 232a, positioning or locating the modular unit 210 relative to at least one of the first and second surfaces 242, 244 (shown in FIG. 2). Insulation 219 can be used between at least a portion of the male portion 232a and female portion 234a of the locating device 230a to absorb vibration and/or shock forces.

Figure 7:
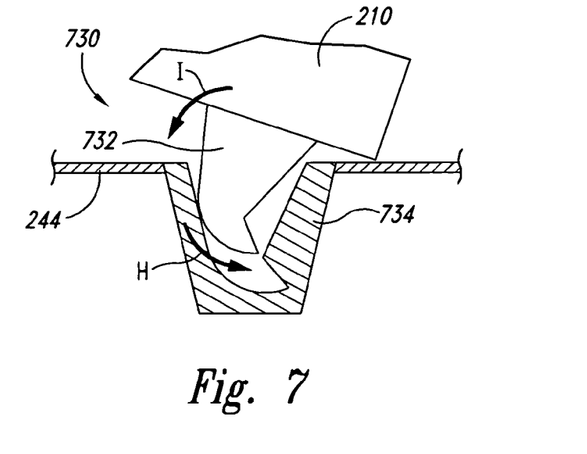
FIG. 7 is a partially schematic cross-sectional illustration of a locating device that can be used in a vehicle system in accordance with still another embodiment of the invention.

FIG. 7 is a partially schematic illustration of a locating device 730 configured in accordance with another embodiment of the invention. The locating device 730 includes a male portion 732 coupled to the modular unit 210 and a female portion 734 coupled to the second surface 244. The male portion includes a fixed curved section that is received and/or engages the female portion 734. The modular unit 210 can be placed to position the male portion 732 of the locating device 730 above and/or partially into the female portion 734. The modular unit 210 can then be rotated in a direction of arrow I causing the male portion 732 to rotate and move in the direction of arrow H to engage the female portion 734. When the male portion 732 is received in the female portion 734, the locating device 730 can position the modular unit 210 relative to the first surface 242 and/or the second surface 244 (shown in FIG. 2). This arrangement can also provide additional restraint of the modular unit 210 in that it can aid in preventing the modular unit 210 from moving directly away from the second surface 244 unless the modular unit 210 is rotated and/or prevent the modular unit from sliding along the second surface 244.

In other embodiments, the locating devices and the latches can be located on the same surface of an aircraft. For example, in FIG. 8, a modular unit 810 is coupled to a single surface 842 of the aircraft. A first locating device 830a and a second locating device 830b can position the modular unit 810 relative to the surface 842. The first locating device 830a can include a male portion 832a coupled to the surface 842 and a female portion 834a coupled to the modular unit 810. Similarly, the second locating device 830b can include a male portion 832b coupled to the surface 842 and a female portion 834b coupled to the modular unit 810.

Figure 8:
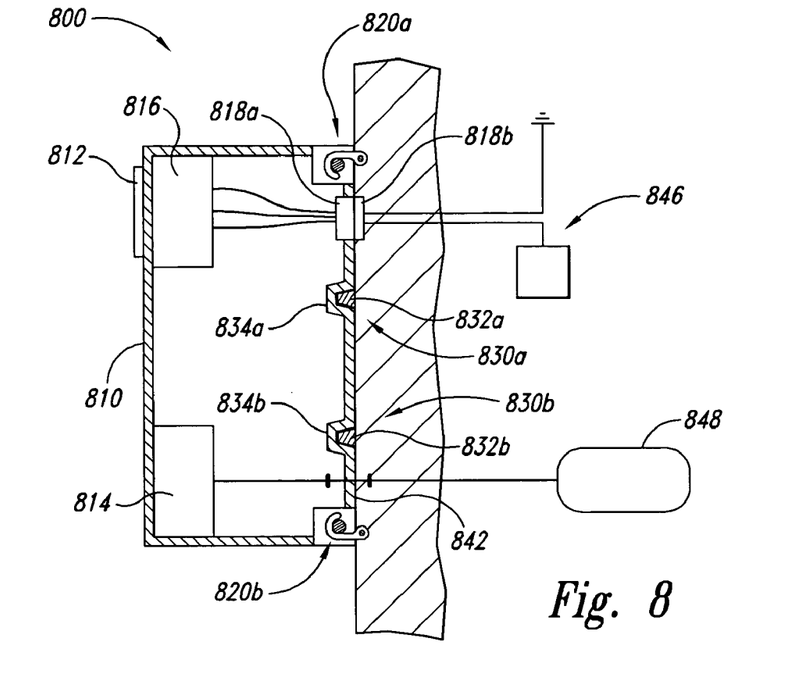
FIG. 8 is a partially schematic cross-sectional elevation view of a vehicle system in accordance with another embodiment of the invention.

A connector 818a can be coupled to the modular unit 810 and be connectable to a second connector 818b that is coupled to the surface 842. The connectors can be configured such that when the first and second locating devices 830a, 830b position the modular unit 810 relative to the surface 842, the first and second connectors 818a, 818b can operatively couple an electromagnetic source 846 to at least a portion of the modular unit 810. The electromagnetic source can be used to power a computing device 816 and a console 812 having a display and controls for the computing device 816. In other embodiments, the electromagnetic source 846 can be operatively coupled to a portion of the modular unit 810 using other arrangements (e.g., the electromagnetic source can be wired directly to a portion of the modular unit 810).

Other systems can be coupled to the modular unit 810 in a similar manner. For example, in FIG. 10 the modular unit 810 can be coupled to another system 848 (e.g., an oxygen system or a fiber optic operated system) and/or can include storage space 814 for other equipment (e.g., an oxygen mask). In still other embodiments, the modular unit 810 can be mechanically connected to the other system 848 (e.g., a mechanical linkage for transmitting the movement of a lever in the modular unit 810 to the other system 848 coupled to the modular unit 810). In yet other embodiments, the modular unit can include at least one door and/or cover (e.g., associated with a storage space or console).

At least one latch 820 can couple the modular unit to the surface 842. In the illustrated embodiment, the aircraft system 800 includes a first latch 820a and a second latch 820b. The first and second latches 820a, 820b in the illustrated embodiment are similar to the latches discussed above with reference to FIGS. 2-3B. Other embodiments can have more or fewer latches and/or different latch arrangements (e.g., in other embodiments, the aircraft system 800 can include at least one latch similar to the latches discussed above with reference to FIGS. 4 and 5). When the latches 820 are in the engaged position, the modular unit can be coupled to the surface 842. When the latches 820 are in the released position, the modular unit 810 can be structurally removable from the aircraft. For example, when the latches 820 are released, the modular unit 810 can be removed from the aircraft without releasing any additional structural elements by (a) pulling the modular unit 810 away from the surface 842 (b) disengaging the first and second locating devices 830a, 830b and (c) disengaging or decoupling the first and second connectors 818a, 818b. In other embodiments, the modular unit 810 is structurally removable from the surface 842 when the latches are in the released position, but wires running to the modular unit 810 must be disconnected and/or the modular unit must be rotated to disengage a locating device (e.g., to disengage a locating device similar to the locating device discussed above with reference to FIG. 7).

Figure 9:
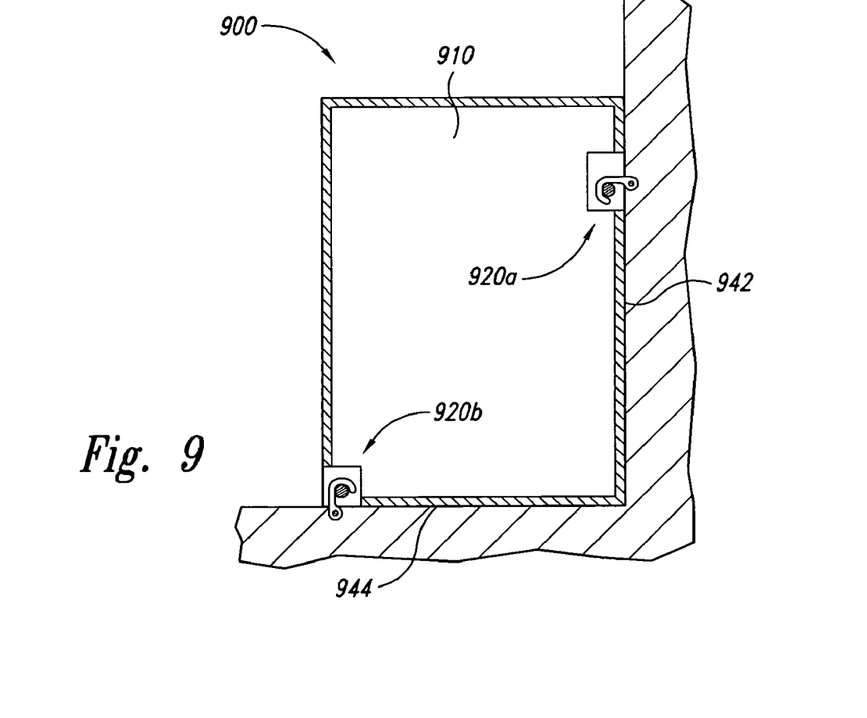
FIG. 9 is a partially schematic cross-sectional elevation view of a vehicle system in accordance with still another embodiment of the invention.

FIG. 9 is a partially schematic illustration of a vehicle system 900 having a modular unit 910 coupled to a first surface 942 by a first latch 920a and coupled to a second surface 944 by a second latch 920b. The first and second latches 920a, 920b in the illustrated embodiment are similar to the latches discussed above with reference to FIGS. 2-3B. Other embodiments can have more or fewer latches and/or different latch arrangements (e.g., in other embodiments, the vehicle system 900 can include at least one latch similar to the latches discussed above with reference to FIGS. 4 and 5). The vehicle system 900 does not include any locating devices. In other embodiments, the vehicle system 900 can include one or more locating devices.

A feature of at least some of the embodiments of the modular units described above is that they can be produced and installed with a smaller total number of parts than is needed with current systems (e.g., cabinets that are mounted to a vehicle using fasteners). Accordingly, the materials needed for manufacturing the units and/or the labor required for manufacturing the units can be reduced. An advantage of this feature is that the manufacturing costs can be reduced over those associated with current systems. An additional advantage of this feature is that the smaller total number of parts can reduce the installed weight of the unit, reducing the amount of fuel necessary to propel the vehicle, and thereby reducing operating costs over those associated with current systems.

Another feature of embodiments described above is that the modular units can be removed and/or installed more easily and more quickly than current systems. This can reduce the labor required to install the units. An advantage of this feature is that installation costs can be reduced. An additional advantage of this feature is that modular units can be easily removed and replaced or reinstalled. For example, a first modular unit can be removed from a vehicle (e.g., an aircraft) and a second modular unit can be coupled to at least one surface of the aircraft with at least one latch. The latch can be movable between an engaged position and a released position. When the latch is in the engaged position the second modular unit can be couplable to the at least one surface and when the latch is in the released position the second modular unit can be structurally removable from the at least one surface.

For example, in one embodiment, the first modular unit and the second modular unit can be the same unit (e.g., the modular unit can be removed, taken to a shop, repaired, returned to the vehicle, and re-installed or re-coupled to the at least one surface). In another embodiment, the first modular unit can be different than the second modular unit (e.g., the second modular unit can replace a first modular unit that has malfunctioning equipment, is broken, and/or is outdated). In certain embodiments, the first modular unit and the second modular unit can share the same latch portion(s) that are coupled to the at least one surface. In other embodiments, the first and second modular units can include latches that have different latch portions coupled to the at least one surface. In certain embodiments, an electromagnetic source and/or an oxygen source can be coupled to at least a portion of the first and/or second modular units.

These features can allow a modular unit to be easily removed and taken to a shop where repairs and/or updates can be accomplished more expeditiously and/or using better equipment than can be accomplished in the vehicle. A spare modular unit can be easily installed to replace the modular unit being repaired or updated and/or the repaired or updated unit can be easily re-installed in the vehicle once the repairs or updates have been made. This can reduce maintenance time over that required for vehicles using current systems and/or reduce the number of spare units that are required because units can be more quickly and efficiently repaired. Additionally, because components carried by the modular unit can be inspected in the shop and because only one or more latches are needed to structurally couple the modular unit to the vehicle, repairs and/or installations are easier to inspect, and maintenance time and expense can be further reduced over that associated with current systems.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

We claim:

1. An aircraft system, comprising:
    a modular unit; and
    at least one latch positioned to couple the modular unit to at least one surface of an aircraft, the latch being movable between an engaged position and a released position, the latch having a first portion coupled to the modular unit and a second portion couplable to the at least one surface, wherein the latch being moveable between the engaged and released positions includes:
        (a) the first portion being movable relative to the modular unit while coupled to the modular unit; or
        (b) the second portion being movable relative to the at least one surface when the second portion is coupled to the at least one surface; or
        (c) both (a) and (b); and
    wherein when the second portion of the latch is coupled to the at least one surface the modular unit is:
        couplable to the at least one surface when the latch is in the engaged position; and
        structurally removable from the aircraft when the latch is in the released position without releasing any additional structural elements.

2. The system of claim 1 wherein the first portion of the latch includes an engagement member and the second portion of the latch includes a catch member, and wherein the engagement member is releasably received by the catch member when the latch is in the engaged position, and further wherein the engagement member is released from the catch member when the latch is in the released position.

3. The system of claim 1 wherein the first portion of the latch includes a catch member and the second portion of the latch includes an engagement member, the catch member including a movable hook and the engagement member including a bar, wherein when the latch is in the engaged position the movable hook is positioned to releasably receive the bar and wherein when the latch is in the released position the movable hook is positioned to release the bar.

4. The system of claim 1 wherein the latch is movable between the engaged position and the released position without the use of a tool.

5. The system of claim 1 wherein the first portion of the latch includes a catch member and the second portion of the latch includes an engagement member, the catch member including a first rotatable hook and a second rotatable hook, the engagement member including a knob, wherein when the latch is in the engaged position, the first and second hooks are rotated toward each other to releasably receive the knob and wherein when the latch is in the released position, the first and second hooks are rotated away from each other and positioned to release the knob.

6. The system of claim 1 wherein the modular unit includes at least one of a console and a storage area.

7. The system of claim 1 wherein the modular unit includes a connector for operatively coupling at least one of an electromagnetic source and an oxygen source to at least a portion of the modular unit.

8. The system of claim 1 wherein the modular unit includes a computing device.

9. The system of claim 1, further comprising at least one locating device for positioning the modular unit relative to the at least one surface, the at least one locating device including a male portion and a female portion, the male portion being positionable into the female portion, one of the male portion and the female portion being coupled to the modular unit.

10. The system of claim 1, further comprising at least one locating device for positioning the modular unit relative to the at least one surface and to prevent movement of the modular device relative to the at least one surface in at least one direction, the at least one locating device including a male portion and a female portion, the male portion being positionable into the female portion, one of the male portion and the female portion being coupled to the modular unit.

11. The system of claim 1, further comprising at least one locating device for positioning the modular unit relative to the at least one surface, the at least one locating device including a male portion and a female portion, the male portion being positionable into the female portion, wherein the male portion includes a fixed curved section that engages a section of the female portion when the modular unit is rotated into position, one of the male portion and the female portion being coupled to the modular unit.

12. The system of claim 1, further comprising insulation positioned between the modular unit and the at least one surface.

13. The system of claim 1, further comprising an aircraft having the at least one surface, the second portion of the latch being coupled to the at least one surface, and wherein the modular unit is coupled to the at least one surface.

14. A vehicle system, comprising:
    a vehicle having a first surface and a second surface, the first surface extending generally along a first plane, and the second surface extending generally along a second plane different than the first plane;
    a modular unit positioned generally against the first and second surfaces; and
    at least one latch positioned to couple the modular unit to at least one of the first and second surfaces, the latch being movable between an engaged position and a released position, the latch having a first portion coupled to the modular unit and a second portion coupled to at least one of the first and second surfaces, wherein the latch being moveable between the engaged and released positions includes:
        (a) the first portion being movable relative to the modular unit while coupled to the modular unit; or
        (b) the second portion being movable relative to the at least one of the first and second surfaces while coupled to the modular unit; or
        (c) both (a) and (b); and wherein the modular unit is:
coupled to at least one of the first and second surfaces when the latch is in the engaged position; and
structurally removable from the vechicle when the latch is in the released position without releasing any additional structural elements.

15. The system of claim 14 wherein the at least one latch includes a first latch for coupling the modular unit to the first surface and a second latch for coupling the modular unit to the second surface.

16. The system of claim 14, further comprising at least one locating device for positioning the modular unit relative to at least one of the first and second surfaces, the at least one locating device including a male portion and a female portion, the male portion being positionable into the female portion, at least one of the male portion and the female portion being coupled to the modular unit.

17. The system of claim 14 wherein the latch is positioned to couple the modular unit to the first surface, and wherein the system further comprises at least one locating device for positioning the modular unit relative to the second surface, the at least one locating device including a male portion and a female portion, the male portion being positionable into the female portion, at least one of the male portion and the female portion being coupled to the modular unit.

18. An aircraft system, comprising:
a modular unit;
at least one releasable coupler positioned to couple the modular unit to at least one surface of an aircraft, the releasable coupler being movable between an engaged position and a released position, the releasable coupler having a first portion coupled to the modular unit and a second portion fixedly couplable to the at least one surface, wherein the releasable coupler being moveable between the engaged and released positions includes:
(a) the first portion being movable relative to the modular unit while coupled to the modular unit; or
(b) the second portion being movable relative to the at least one surface when the second portion is coupled to the modular unit; or
(c) both (a) and (b); and
wherein when the second portion of the releasable coupler is fixedly couplable to the at least one surface the modular unit is:
couplable to the at least one surface when the releasable coupler is in the engaged position; and
structurally removable from the aircraft when the releasable coupler is in the released position; without releasing any additional structural elements and
at least one locating device to position the modular unit relative to the at least one surface, the locating device having a male portion and a female portion, the male portion being positionable into the female portion, wherein the male portion or the female portion is coupled to the modular unit.

19. The system of claim 18, further comprising a connector to operatively couple at least one of an electromagnetic source and an oxygen source to at least a portion of the modular unit.

20. The system of claim 18, further comprising an aircraft having at least one surface, the second portion of the releasable coupler being coupled to the at least one surface, and wherein the modular unit is coupled to the at least one surface.

21. An aircraft system, comprising:
an aircraft having a flight deck with at least one surface;
a modular unit having at least one of a console and a storage area;
at least one releasable coupler positioned to couple the modular unit to the at least one surface of the flight deck, the releasable coupler being movable between an engaged position and a released position, the releasable coupler having at least one of (a) a first portion coupled to the modular unit and a second portion coupled to the at least one surface and (b) a first portion coupled to the at least one surface and a second portion coupled to the modular unit, wherein the first portion of the latch includes a catch member and the second portion of the latch includes an engagement member, the catch member including a movable hook and the engagement member including a bar or a knob, wherein when the latch is in the engaged position the movable hook is positioned to releasably receive the bar or the knob and wherein when the latch is in the released position the movable hook is positioned to release the bar or the knob, wherein the hook is movable between the engaged position and the released position while the modular unit remains stationary and further wherein the modular unit is:
coupled to the at least one surface when the releasable coupler is in the engaged position; and
structurally removable from the aircraft when the releasable coupler is in the released position; without releasing any additional structural elements and
at least one locating device to position the modular unit relative to the at least one surface, the locating device having a male portion and a female portion, the male portion being positionable into the female portion, wherein the male portion or the female portion is coupled to the modular unit.

22. The system of claim 21 wherein a flight deck having at least one surface includes a flight deck having at least a first surface extending generally along a first plane and a second surface extending generally along a second plane different than the first plane, and wherein the modular unit is positioned generally against the first and second surfaces when the modular unit is coupled to the at least one surface.

23. An aircraft system, comprising:
a modular unit couplable to the at least one surface of an aircraft; and
latch means for coupling the modular unit to the at least one surface, the latch means being movable between an engaged position and a released position, the latch means having a first portion being coupled to the modular unit and a second portion being couplable to the at least one surface, wherein the latch means being moveable between the engaged and released positions includes:
(a) the first portion being movable relative to the modular unit while coupled to the modular unit; or
(b) the second portion being movable relative to the at least one surface when coupled to the at least one surface; or
(c) both (a) and (b); and
wherein when the second portion is coupled to the at least one surface the modular unit is:
couplable to the at least one surface when the latch means is in the engaged position; and
structurally removable from the aircraft when the latch means is in the released position without releasing any additional structural elements.

24. The system of claim 23, further comprising an aircraft having at least one surface, wherein the modular unit is coupled to the at least one surface of the aircraft.

25. The system of claim 23, further comprising locating means for positioning the modular unit relative to the at least one surface.

26. A vehicle system, comprising:

a vehicle having a first surface and a second surface, the first surface extending generally along a first plane, and the second surface extending generally along a second plane different than the first plane;

a modular unit positioned generally against the first and second surfaces; and latch means for coupling the modular unit to at least one of the first and second surfaces, the latch means being movable between an engaged position and a released position, the latch means having a first portion being coupled to the modular unit and a second portion being coupled to at least one of the first and second surfaces, wherein the latch means being moveable between the engaged and released positions includes:

(a) the first portion being movable relative to the modular unit while coupled to the modular unit; or (b) the second portion being movable relative to the at least one of the first and second surfaces while coupled to the at least one of the first and second surfaces; or (c) both (a) and (b); and wherein the modular unit is:

coupled to at least one of the first and second surfaces when the latch means is in the engaged position; and structurally removable from the vehicle when the latch means is in the released position without releasing any additional structural elements.

27. The system of claim 26, further comprising locating means for positioning the modular unit relative to at least one of the first and second surfaces.

28. The system of claim 1 wherein the modular unit includes at least a portion of an electronic flight bag system.

29. The system of claim 1 wherein:

(a) the first portion of the latch includes at least one hook pivotally coupled to the modular unit and configured to rotate when the latch is moved between the engaged position and the released position;

(b) the second portion of the latch includes at least one hook pivotally coupled to the at least one surface and configured to rotate when the latch is moved between the engaged position and the released position; or (c) both (a) and (b).

30. The system of claim 1 wherein the modular unit includes a computing device and a display.

31. The system of claim 14 wherein the modular unit includes at least a portion of an electronic flight bag system.

32. The system of claim 18 wherein the modular unit includes at least a portion of an electronic flight bag system.

33. The system of claim 21 wherein the modular unit includes at least a portion of an electronic flight bag system.

34. The system of claim 23 wherein the modular unit includes at least a portion of an electronic flight bag system.

35. The system of claim 26 wherein the modular unit includes at least a portion of an electronic flight bag system.

* * * * *

UNITED STATES PATENT AND TRADEMARK OFFICE
CERTIFICATE OF CORRECTION

| | |
|---|---|
| PATENT NO. | : 7,309,045 B2 |
| APPLICATION NO. | : 10/978890 |
| DATED | : December 18, 2007 |
| INVENTOR(S) | : Melberg et al. |

It is certified that error appears in the above-identified patent and that said Letters Patent is hereby corrected as shown below:

In column 11, line 4, in Claim 14, delete "vechicle" and insert -- vehicle --, therefor.

In column 11, line 49, in Claim 18, after "position" delete ";".

In column 11, line 50, in Claim 18, after "element" insert -- ; --.

In column 12, line 27, in Claim 21, after "position" delete ";".

In column 12, line 28, in Claim 21, after "element" insert -- ; --.

Signed and Sealed this

Sixth Day of January, 2009

JON W. DUDAS
*Director of the United States Patent and Trademark Office*